United States Patent
Roach

(10) Patent No.: US 8,309,223 B2
(45) Date of Patent: Nov. 13, 2012

(54) POLYIMIDE BASED PURGE MEDIA AND METHODS RELATING THERETO

(76) Inventor: David Herbert Roach, Hockessin, DE (US)

(*) Notice: Subject to any disclaimer, the term of this patent is extended or adjusted under 35 U.S.C. 154(b) by 217 days.

(21) Appl. No.: 12/974,177

(22) Filed: Dec. 21, 2010

(65) Prior Publication Data

US 2012/0003476 A1 Jan. 5, 2012

Related U.S. Application Data

(60) Provisional application No. 61/288,968, filed on Dec. 22, 2009.

(51) Int. Cl.
*B32B 5/16* (2006.01)
*B29B 9/00* (2006.01)
*B29C 51/04* (2006.01)

(52) U.S. Cl. .............. 428/402; 241/23; 241/27; 264/13; 264/291; 264/331.11; 264/331.19; 510/188; 510/364; 510/445; 510/451; 510/475; 510/499

(58) Field of Classification Search .............. 241/23, 241/27; 264/13, 291, 319, 331.19, 331.11; 428/402; 510/364, 475, 499, 188, 445, 451
See application file for complete search history.

(56) References Cited

U.S. PATENT DOCUMENTS

| | | | |
|---|---|---|---|
| 5,238,608 A | | 8/1993 | Obama et al. |
| 5,395,456 A * | | 3/1995 | Abrams et al. ............ 134/22.14 |
| 5,415,354 A * | | 5/1995 | Shutov et al. .................... 241/16 |
| 5,704,555 A * | | 1/1998 | Arastoopour .................... 241/16 |
| 6,001,188 A | | 12/1999 | Walsh et al. |
| 6,475,412 B1 | | 11/2002 | Roach |
| 6,494,390 B1 | | 12/2002 | Khait et al. |
| 7,025,070 B2 * | | 4/2006 | Sato .......................... 134/22.14 |
| 2003/0221707 A1 | | 12/2003 | Blanton et al. |

FOREIGN PATENT DOCUMENTS

| | | |
|---|---|---|
| EP | 0 803 338 A2 | 10/1997 |
| JP | 1983125732 A | 7/1983 |
| JP | 1999 048302 A | 2/1999 |
| JP | 2001348600 A | 12/2001 |
| JP | 3558623 B2 | 8/2004 |
| JP | 2006 160897 A | 6/2006 |
| JP | 3815060 B2 | 8/2006 |
| JP | 2008 096888 A | 4/2008 |

OTHER PUBLICATIONS

Hallensleben, Axel, Removal of Organic and Inorganic Deposits, Industrie-Anzeiger (1995), 117 (44), 46-7, Abstract.
M. Xanthos, "Reactive Extrusion Principles and Practice", Oxford University Press, 1992, pp. 222-225.

* cited by examiner

*Primary Examiner* — Hoa (Holly) Le

(57) ABSTRACT

A method is disclosed for the manufacture of a powdered polyimide extrudate for use as a purge media. The method includes feeding a polyimide film material into an extruder having a first zone that provides heating and a subsequent second zone that provides endothermic shearing. In one embodiment, the resulting purge media comprises a sheared polyimide powder having an average particle size in a range of about 5 to 100 microns (or any sub-range thereof). The purge media can comprises up to 35 weight percent other additives.

8 Claims, No Drawings

POLYIMIDE BASED PURGE MEDIA AND METHODS RELATING THERETO

FIELD OF THE INVENTION

The present invention relates generally to a purge media for cleaning extrusion type equipment and similar type applications. More specifically, the purge media of the present disclosure comprises a polyimide based powder derived from scrap polyimide film.

BACKGROUND OF THE INVENTION

Broadly speaking, extrusion processes are known. Typically, thermoplastic polymer ("TP") material is fed into an extruder in a powdered, granular or pelletized form and then converted into a continuous stream of melted TP material by a heated barrel screw. In such applications, a certain amount of slippage or bypass of the melted TP material generally occurs along the screw flights and between the screw and the barrel. This slippage and bypass, although useful for efficient TP processing, also causes unwanted problems—the old color or feed stock will tend to contaminate a new color or new feed stock, necessitating production of undesired or unusable material until the original color or TP is cleared completely from the unit. Also, portions of the feed material can adsorb onto internal metal surfaces and can build up and cause problems over time.

One remedy is to clean the extruder with a purge compound. See for example, U.S. published patent application 2003/0221707 A1 to Blanton et al. A common type of purge compound comprises a thermoplastic material having a higher melting point than the material being purged from the extruder. Such purge compounds can also carry abrasives or chemical cleaners to aid in cleaning the equipment as the purge compound is moved through the extruder. Conventional purge materials can be expensive, inefficient, environmentally unfriendly, overly abrasive and/or otherwise problematic. A need therefore persists for improved purge compositions and methods for cleaning plastics processing equipment, e.g., are relatively inexpensive and efficient, do not necessitate disassembly of equipment to accomplish proper cleaning and do not cause undue abrasion or other damage when used.

SUMMARY OF THE INVENTION

The present disclosure is directed to a method of manufacturing a powdered extrudate for use as a purge media. The method includes feeding a polyimide film material into an extruder having a first zone that provides heating and a subsequent second zone that provides endothermic shearing. Endothermic shearing is intended to mean mechanical shearing of the polyimide material due to the movement of an extruder screw while heat is removed from the sheared polyimide. The feed rate of the polyimide film should generally be less than the maximum feed rate of the extruder. In one embodiment, the polyimide material is processed within the extruder for at least 0.5, 1, 2, 3, 4, 5, 6, 7, 8, 9, 10, 12, 14, 15, 17, 18 or 20 seconds at a temperature greater than 200, 250, 275, 285, 300, 325, or 350° C.

In one embodiment, the extruder residence time is in a range of 2 to 30 seconds with an average temperature during such residence time of greater than 300° C. In another embodiment, the residence time of the polyimide material is pre-heated to a temperature of at least 275° C. and the average temperature during the residence time is less than 400° C. In one embodiment, the total residence time is less than 20 seconds.

In one embodiment, the resulting purge media comprises a sheared polyimide powder having an average particle size in a range between (and optionally including) any two of the following: 5, 10, 25, 50, 75, 85, 90, 95 and 100 microns. Due to endothermic shearing the polyimide powder particles are stretched or oriented in at least one dimension. In one embodiment, the purge media further comprises at least 1 weight percent inorganic particles. In another embodiment, the inorganic particles or other filler (incorporated into the purge media) where the particles and/or filler have an average size in at least one dimension of between 0.05 microns and 2 microns.

In one embodiment, the purge media comprises up to 35 weight percent of one or more of the following: fillers, plasticizers, surfactants, intercalants, compatibilizers, coupling agents, impact modifiers, chain extenders, colorants, lubricants, antistatic agents, pigments, dispersants, metallic salts of fatty acids, dyes, antioxidants, fluorescent whiteners, ultraviolet absorbers, fire retardants, roughening agents, cross linking agents, and foaming agents.

DETAILED DESCRIPTION OF THE PREFERRED EMBODIMENTS

The present disclosure is directed to processing scrap polyimide based film into a useful purge material. The polyimide polymer component of the scrap polyimide film (to be converted into a purge material) can be any conventional or non-conventional polyimide polymer or polyimide copolymer. In one embodiment, the scrap polyimide film can comprise components other than polyimide polymer in an amount up to 0, 1, 2, 3, 5, 7, 10, 12, 15, 20, 25, 30, 35, or 40 weight percent of the scrap polyimide film. Such other components can be processing aids, colorants, fillers, other polymers or polymeric materials and the like. In one embodiment, the scrap polyimide film can be of any width and has a thickness within a range from about 2 to about 500 microns.

In one embodiment, the processes of the present disclosure require no pre-processing of the scrap polyimide film. In some embodiments, the scrap polyimide film is slit to smaller film dimensions for ease in handling and/or to accommodate extruders that would otherwise lack capacity and/or power to process the scrap polyimide film.

The processes of the present disclosure include an extrusion step. The type of extruder is not limiting and any conventional or non-conventional extruder could potentially be used in accordance with the present disclosure. One example of an extruder is a 16-mm Prism extruder (Prism, Staffordshire, UK) having five heatable zones. In one embodiment, the machine setting on the first (pre-heating) zone can be about 275° C. In one embodiment, the fifth (downstream) zone of the Prism extruder, usually present as a heated die, can be removed and replaced with an unheated 1.5-inch (3.8 cm) tip to protect the operator from sharp edges and moving parts. The remaining three zones can be set so that the scrap polyimide film can be subjected to measured temperatures between about 300 and 425° C. In such an embodiment, the throat of the extruder can be cooled with room temperature (about 20° C.) water, but generally air need not be excluded from the throat. In this particular embodiment, a "Vacuum Extraction" screw series can be used, and the screw can have the following sections: 3 deep feed sections, 8 regular conveying sections, 7 paddles @ 30° (kneading sections), 5 paddles @ 60° (kneading sections), 1 regular conveying section, 1 reverse (left hand) section, 2 regular conveying sections, 10 paddles @ 60° (kneading sections), 3 regular conveying sections and a 1 1.5-inch (3.8 cm) diameter tip. In this particular example, the ratio of the length to the inner diameter of the extruder is about 25. The extrudate can be caught in bins, and room temperature (approximately 20° C.) air can be blown over it to cool it. In this particular example, the temperature to which the scrap polyimide film is subjected can be measured (as distinct from the machine setting) at the three middle zones (zones 2, 3, and 4) of the extruder. Residence times can be calculated from M. Xanthos, "Reactive Extrusion Principles and Practice", pp. 222-225, Oxford University Press, 1992.

In one embodiment, the scrap polyimide film is fed directly into an extruder. The extruder temperature is maintained (by adding or removing heat) in a range between and optionally including any two of the following temperatures: 300° C., 325° C., 350° C., 275° C., 400° C., and 425° C. In one embodiment, the total residence time of the polyimide film in the extruder is in a range between (and optionally including) any two of the following: 3, 5, 7, 10, 12, 15, 20 and 22 seconds. Use of slower extruder speeds (rpm) and therefore longer total residence times will tend to cause the process to be run at lower temperatures within the above ranges to form the final powder without degradation. Even at short total residence times, about 3.5-5 seconds, the average temperature generally should be at least 1, 2, 3, 4, 5, 6, 7, 8, 9, 10, 12, 15, or 20 degrees (Centigrade) less than the decomposition temperature of the polyimide film.

Optionally, the first heating zone of the extruder can be used as a pre-heating zone (for example at a machine setting of about 250° C.), and the average temperature to which the polyimide film is subjected can then be measured in subsequent heating zones. In the processes of the present disclosure, the scrap polyimide film is fed to the extruder at less than the maximum feed rate that the extruder is capable of processing, so the extruder is slightly "starved". If too much material is fed to the extruder, the resulting extrudate will tend to clump, and an excessive rise in extruder torque can be created.

The finely divided polyimide particulate made from the processes of the present disclosure is used as a high temperature polymeric abrasion medium. For example, the particulate can be used as a purge medium for extrusion processes. In such an application, the purge step can be performed at temperatures 2, 5, 10, 15, 20 or more degrees (Centigrade) below the decomposition temperature of the polyimide particulate. At such temperatures many conventional extruded polymeric materials soften or melt and can be readily removed by the particulate purge media of the present disclosure. Conventional high temperature purge media tend to comprise inorganic particles which can high temperature resistance but are also tend to be highly abrasive during the extruder purge. The polyimide particulate of the present disclosure generally has sufficient heat resistance at conventional purge temperatures, but is generally much less abrasive compared to conventional inorganic particles, e.g., inorganic oxides, nitrides, carbides and/or the like.

The pulverized particulates tend to have a rounded shape and smooth surfaces which are suggestive of a solid state shearing phenomenon. Depending upon the type of extrusion process selected, the powdered material can have a size (in at least one dimension) of less than about 500, 250, 100, 50, 25, 10, 5, 2, 1, 0.75 or 0.50 microns. The size range of a particular recycled polymeric powder produced by the invention will depend on the screw configuration, and the pulverization parameters employed, such as pulverization temperatures, pressures, screw rpm, and feed rates. The present disclosure is not to be construed as limited to any particular type or sequence of screw elements and barrel sections.

While the invention has been described in terms of specific embodiments thereof, it is not intended to be limited thereto but rather only to the extent set forth hereafter in the following claims.

What is claimed is:

1. A method of manufacturing a purge media, comprising:
    (i.) feeding a polyimide film material into an extruder having a first zone that provides heating and a subsequent second zone that provides endothermic shearing, the feed rate of the polyimide film being less than the maximum feed rate of the extruder; and
    (ii.) extruding the material for at least 0.5 seconds at a temperature greater than 300° C. to provide a powdered extrudate purge media.

2. A method in accordance with claim 1, wherein the extruder residence time in a range of 2 to 30 seconds with an average temperature during such residence time of greater than 300° C.

3. A method in accordance with claim 2, wherein during said residence time the material is pre-heated to a temperature of at least 275° C. and the average temperature during the residence time is less than 400° C.

4. A method in accordance with claim 3, wherein the total residence time is less than 20 seconds.

5. A purge media comprising a sheared polyimide powder having an average particle size from 5 to 100 microns, the polyimide powder particles being stretched or oriented in at least one dimension.

6. A purge media in accordance with claim 5, wherein the purge media further comprises at least 1 weight percent inorganic particles.

7. A purge media in accordance with claim 6, wherein said inorganic particle has a size of between 0.05 microns and 2 microns in at least one dimension.

8. A purge media in accordance with claim 6, comprising up to 35 weight percent of one or more of the group consisting of: fillers, plasticizers, surfactants, intercalants, compatibilizers, coupling agents, impact modifiers, chain extenders, colorants, lubricants, antistatic agents, pigments, dispersants, metallic salts of fatty acids, dyes, antioxidants, fluorescent whiteners, ultraviolet absorbers, fire retardants, roughening agents, cross linking agents, and foaming agents.

* * * * *